April 21, 1964

P. R. HANAWAY 3,130,282

SOLENOID OPERATED SWITCHES

Filed July 14, 1961

INVENTOR.
PAUL R. HANAWAY

BY *Alfred W. Petersen*

ATTORNEY

April 21, 1964 P. R. HANAWAY 3,130,282
SOLENOID OPERATED SWITCHES
Filed July 14, 1961 3 Sheets-Sheet 2
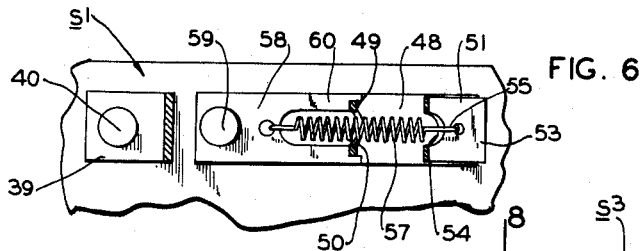
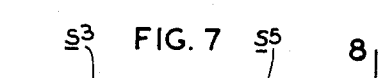
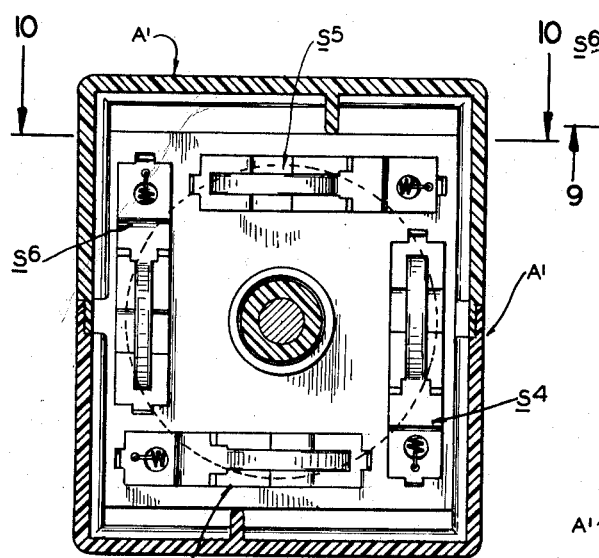
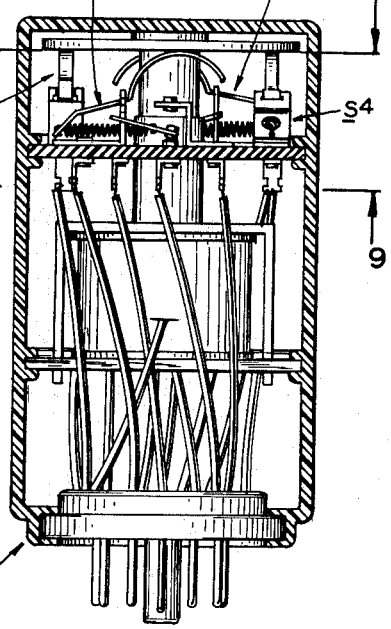
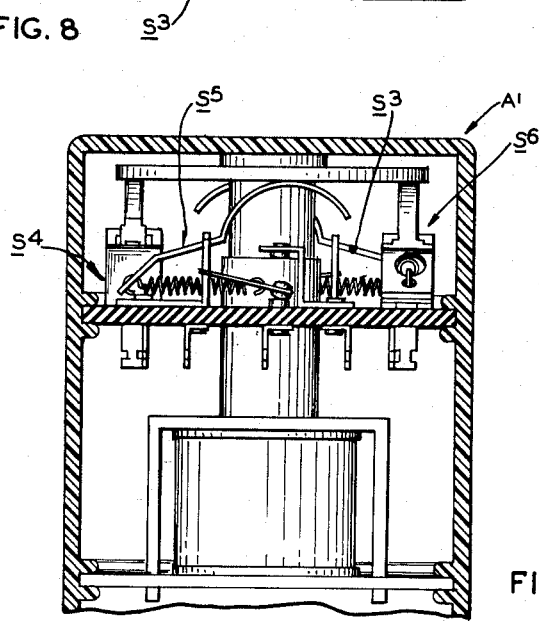
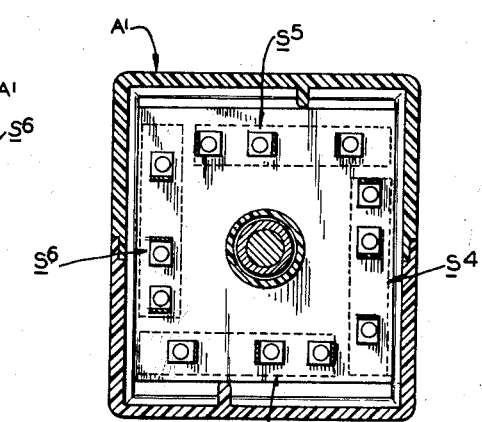
INVENTOR.
PAUL R. HANAWAY
BY
ATTORNEY

INVENTOR.
PAUL R. HANAWAY
BY
ATTORNEY

United States Patent Office 3,130,282
Patented Apr. 21, 1964

3,130,282
SOLENOID OPERATED SWITCHES
Paul R. Hanaway, Glendale, Mo., assignor, by mesne assignments, to Electro Mechanics, Inc., Fort Lauderdale, Fla., a corporation of Florida
Filed July 14, 1961, Ser. No. 124,198
11 Claims. (Cl. 200—87)

This invention relates in general to certain new and useful improvements in solenoid operated switches.

It is the primary object of the present invention to provide a solenoid operated switching device which is extremely compact and is designed for quick installation and removal from an electrical circuit with which it is utilized.

It is another object of the present invention to provide a solenoid operated switch of the type stated which is simple and economical in construction and is entirely self-contained for simple replacement in the event of breakdown or failure.

It is also an object of the present invention to provide a solenoid operated switching device in which the contactors are of the snap-action type and will, therefore, achieve a very rapid make and break.

With the above and other objects in view, my invention resides in the novel feature of form, construction, arrangement, and combination of parts presently described and pointed out in the claims.

In the accompanying drawings—

Figure 1:
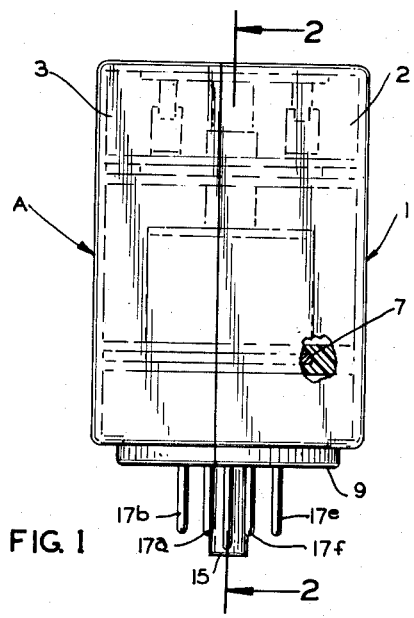
FIG. 1 is a side elevational view of a solenoid operated switch constructed in accordance with and embodying the present invention.
Figure 2:
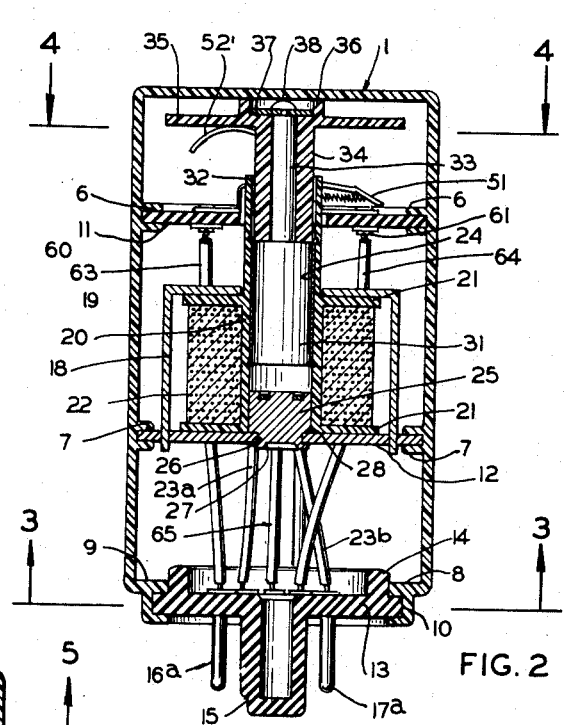
FIG. 2 is a vertical sectional view taken along line 2—2 of FIG. 1.
Figure 4:
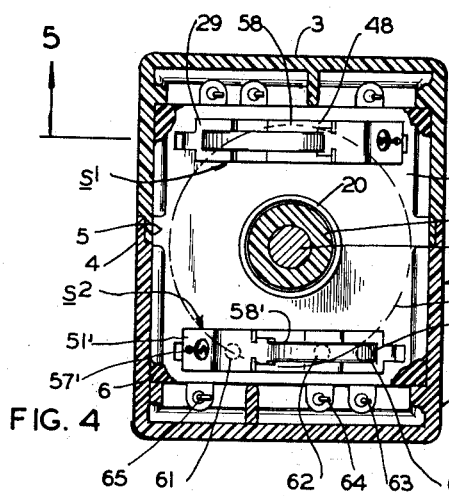
Figure 3:
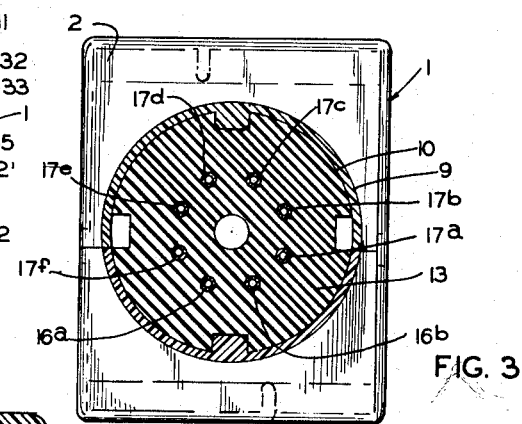
Figure 5:
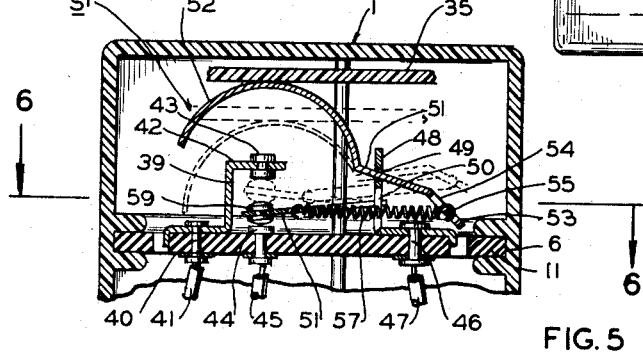
Figure 11:
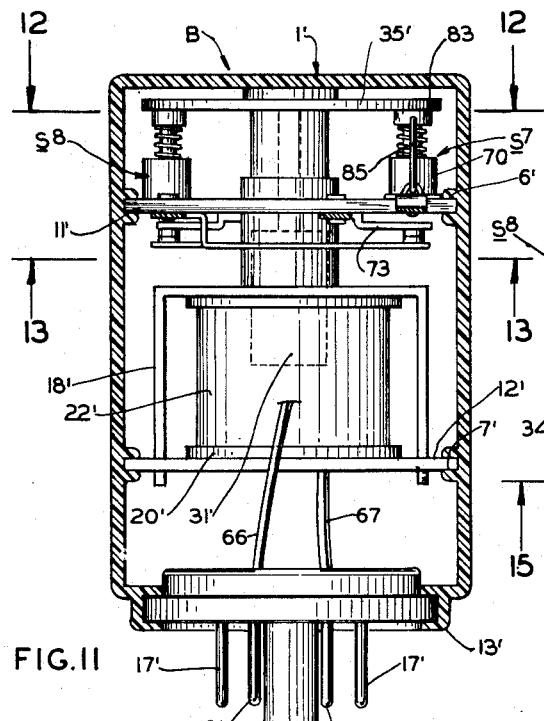
Figure 12:
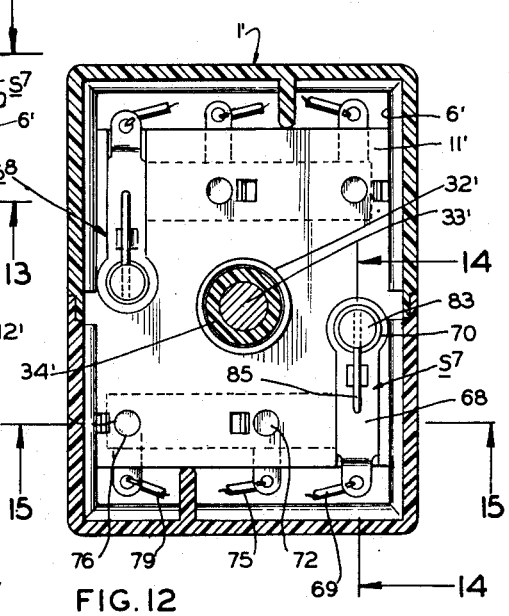
Figure 14:
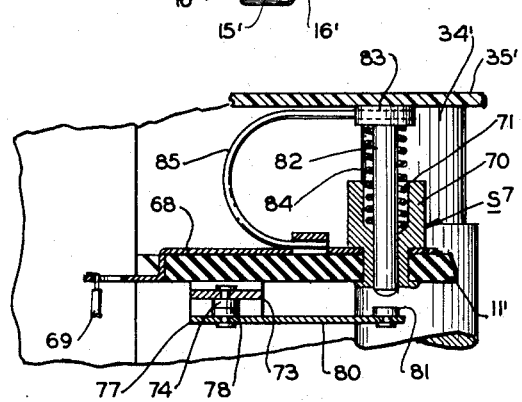
Figure 13:
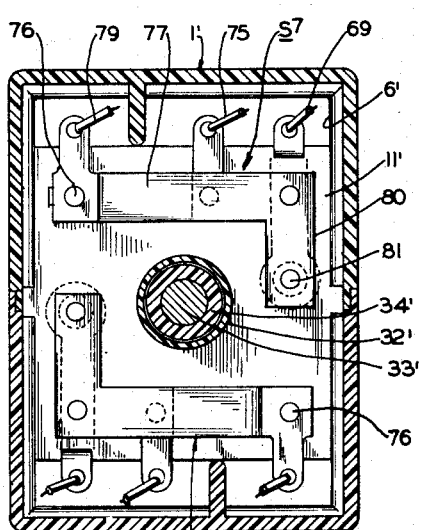
Figure 15:
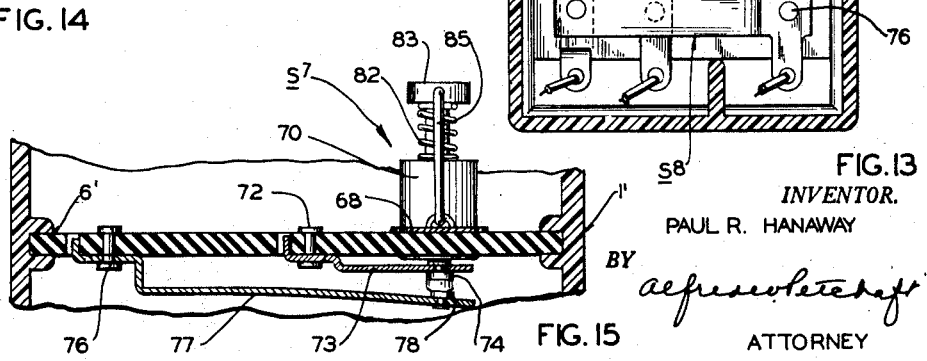

FIGS. 3 and 4 are transverse sectional views taken along lines 3—3 and 4—4, respectively, of FIG. 2;

FIG. 5 is a fragmentary sectional view taken along line 5—5 of FIG. 3;

FIG. 6 is a fragmentary sectional view taken along line 7—7 of FIG. 5;

FIG. 7 is a vertical sectional view of a modified form of switch constructed in accordance with and embodying the present invention;

FIGS. 8 and 9 are transverse sectional views taken along lines 8—8 and 9—9, respectively, of FIG. 7;

FIG. 10 is a fragmentary sectional view taken along line 10—10 of FIG. 8;

FIG. 11 is a vertical sectional view of another modified form of switch constructed in accordance with and embodying the present invention;

FIGS. 12 and 13 are transverse sectional views taken along lines 12—12 and 13—13, respectively, of FIG. 11; and FIGS. 14 and 15 are fragmentary sectional views taken along lines 14—14 and 15—15, respectively, of FIG. 12.

Referring now in more detail and by reference characters to the drawings, which illustrate practical embodiments of the present invention, A designates a solenoid operated switch comprising a rectilinear box-like housing 1 consisting of two lengthwise meeting sections 2, 3. The section 2 is provided with a peripheral channel 4 and the section 3 is provided with a peripheral tongue 5 adapted to seat snugly within the channel 4 when the two sections are brought together. Preferably the two sections are molded from nylon, polyethylene, polypropylene, or similar dielectric synthetic resin and are designated to snap-fit together for simplicity in assembly.

Molded or otherwise formed around the interior of the housing 1 are two inwardly opening channels 6, 7, located in axially spaced parallel relation to each other and similarly formed in the bottom wall 8 is a circular aperture 9 bordered by an inwardly opening circular channel 10. Peripherally engaged in, and retained by, the channels 6, 7, 10, are wafer-like rectangular plates 11, 12, 13, formed of thin structurally strong material. The plates 11, 12 are arranged in spaced parallel relation across the shell, as shown in FIG. 2, to form two end compartments and are intermediate cage. The plate 13 is dielectric and is circular in peripheral shape to conform to, and fit snugly within, the channel 10, being integrally provided on its upper face with an upstanding annular rim 14 having an outside diametral size adapted to fit precisely within the aperture 9. On its downwardly presented or external face, the plate 13 is provided with a cylindrical coaxial socket-post 15 adapted to fit within a conventional socket of the radio-tube type (the latter being conventional and, therefore, not being shown or described herein). Also molded into or otherwise rigidly mounted in the plate 13 in uniformly spaced annular relation around the central socket-post 15 are eight contact-pins $16^a$, $16^b$, $17^a$, $17^b$, $17^c$, $17^d$, $17^e$, and $17^f$, which are also adapted to fit, in the usual manner, within corresponding female-contacts of the conventional socket.

Staked in, and projecting upwardly from, the plate 12 is a U-shaped frame 18 having a transverse bight 19 which is disposed in upwardly spaced parallel relation to the plate 12 and rigidly between the bight 19 and plate 12 is a cylindrical nylon spool 20 which is disposed in coaxial alignment with the plates 11, 12, and is integrally provided with axially spaced annular flanges 21, 21′. Wound therebetween is a coil 22 of insulated magnet-wire having connection-leads $23^a$, $23^b$, respectively connected to the pins $16^a$, $16^b$. The coil 22 is wound in the usual and conventional manner and the spool 20 is held securely and immovably between the bight 19 of the frame 18 and the underside of the plate 12. The interior or axial bore of the spool 20 is provided with a tight-fitting thin brass sleeve 24 which serves to establish the internal diametral size of the spool 20 in the event that the spool 20 tends to change dimension slightly under influence of atmospheric conditions. At its lower end, the sleeve 24 is rigidly supported on the plate 12 by means of a cylindrical plug 25 which extends through an aperture 26, being upset or peened-over, as at 27, so as to draw the shoulder 28 into tight-fitted engagement against the face of the plate 12. In this connection, it should be noted that the plate 12, the frame 18, and plug 25 are made of iron so as to create a magnetic yoke around the coil 22.

Slidably mounted within the sleeve 24 of the spool 20 above the plug 25 is a cylindrical iron rod 31 externally sheathed in a thin nylon jacket 32 and provided with an upwardly projecting coaxial extension or plunger-rod 33, which fits tightly within a dielectric sleeve 34 provided at its upper end with a diametrally enlarged disk-flange 35 and upstanding annular bumper-shoulder 36. The sleeve 34 is attached to the plunger-rod 33 by means of a metal washer 37 which is rigidly secured to the peened-over end 38 of the plunger-rod 33, as shown in FIG. 2.

The plate 11 is made of some suitable dielectric material such as phenolic resin and is provided upon its upper face with two switch assemblies $s^1$, $s^2$, as shown generally in FIG. 3. These switch assemblies $s^1$, $s^2$, are identical and, therefore, only one, namely the switch assembly $s^1$, as shown in FIG. 5, will be described herein in detail. This switch assembly $s^1$ consists of a bronze bracket 39 secured to the plate 11 by means of a conductive rivet 40 and electrically connected to the contact-pin $17^a$ by means of an insulated conductor 41. The bracket 39 is integrally provided with an offset arm 42 disposed in upwardly spaced parallel relation to the plate 11 and is provided with a contact-button 43 which overlies and is aligned with a contact-button 44 rigidly seated in the plate 11 and connected by an insulated conductor 45 to the contact-pin $17^b$. Also secured to the plate 11 by means of a conductive rivet 46 and connected to the contact-pin $17^c$ by means of an insulated conductor 47 is a second bracket 48 having vertically spaced apertures 49, 50. Rockably mounted in, and extending through, the aperture 50 is an actuator-arm 51 integrally provided at one end with a relatively large arcuate slide-shoe 52, which bears slidably against the underface of the disk-flange 35. At its other end, the actuator-arm 51 is integrally provided with an angularly downwardly deflected ear 53 having an aperture 54 and cross-bar 55 for hooked engagement with one of a tension spring 57 which is, in turn, hooked at its other end into the rocking end of a switch blade 58 having a double-faced contact-button 59. At its other end, the switch blade 58 is provided with longitudinally projecting tongues 60 which are pivotally seated in the aperture 50 of the bracket 48. The switch blade 58 is longitudinally bifurcated or slotted between the tongues 60 to provide clearance for the spring 57, as shown in FIG. 6, which operates with a toggle-action and snaps the switch blade 58 into alternative positions, i.e., the position shown in full lines or the position shown in dotted lines in FIG. 5. When the coil 22 is energized and draws the plunger-rod 33 down, the disk-flange 35 will push the slide-shoe 52 down to the position shown in dotted lines in FIG. 5, and the switch blade 58 will snap into so-called "up" position, i.e. the contact-button 59 will be in contactive engagement with the contact-button 43. When the coil 22 is de-energized, the spring 57 will cause the arm 51 and disk-flange 35 again to move upwardly to the position shown in full lines in FIG. 5 and the switch blade 58 will snap into "down" position, .i.e, the contact-button 59 will be in contact with the contact-button 44.

The switch $s^2$ is provided with conductive rivets 60, 61, which are identical with the conductive rivets 40, 46, and with a contact-button 62 which is identical with the contact-button 44, said conductive rivets 60, 61, and contact button 62 being respectively connected by insulated conductors 63, 64, 65, to the contact-pins $17^d$, $17^e$, and $17^f$. This switch $s^2$ also includes an actuator-arm $51'$, a slide-shoe $52'$, a spring $57'$, and switch blade $58'$, all identical to the corresponding elements of the switch $s^1$ previously described. Thus, when the switch A is plugged into a suitable socket, the effect is to insert a double-pole, double-throw solenoid actuated switch into the circuitry to which such socket is wired.

For purposes of illustration and description herein, the switch A has been shown in a vertical position and the plate 11 has been referred to as being at the "upper" end of the structure. However, it should be clearly understood that the switch A may be mounted in any position and the parts thereof will operate equally well regardless of orientation. It has been found, as a result of actual experience with switches constructed in accordance with the present invention, that the toggle springs 57 not only hold the switch blades 58, $58'$, in their respective positions, but also urge the plunger-rod 33 and its associated structure upwardly, so that the switch is extremely sensitive and will respond to relatively small current in the coil 22.

It is also possible to provide a modified form of switch $A'$ as shown in FIGS. 7 to 10, inclusive, which is identical with the previously described switch A except that it has four switches $s^3$, $s^4$, $s^5$, $s^6$, all identical with the previously described switch $s^1$. Thus, the switch $A'$ will, in effect, constitute a four-pole, double-throw switch.

It is also possible to provide a so-called "make-before-break" type of switch unit constructed in accordance with and embodying the present invention, such as the switch unit B shown in FIGS. 11 to 15, inclusive, which comprises a two-part housing $1'$ substantially identical to the previously described housing 1 and being internally provided with channels $6'$, $7'$, for supporting plates $11'$, $12'$. Staked into the plate $12'$ is a U-shaped frame $18'$ which secures a spool $20'$ and coil $22'$, all substantially identical to the corresponding elements of the switch unit A. Shiftably mounted in the spool $20'$ is a rod $31'$ having a nylon sheath $32'$ and a plunger-rod $33'$, which fits tightly within a dielectric sleeve $34'$ provided at its upper end with a disk-flange $35'$.

The bottom of the housing $1'$ is provided with a dielectric plate $13'$ having a socket-post $15'$ and a plurality of contact-pins $16'$, $17'$. The socket-post $15'$ and contact-pins $16'$, $17'$, are adapted for conventional disposition in a socket (not shown), the contact-pins $16'$ being connected by insulated conductors 66, 67, to the coil $22'$.

Mounted on the plate $11'$ are two switch assemblies $s^7$, $s^8$, which are identical and, therefore, only one, namely the switch assembly $s^7$, shown in FIGS. 14 and 15, will be described in detail. This switch assembly $s^7$ consists of a conductive strip 68 molded or otherwise rigidly mounted in the plate $11'$ and connected by an insulated conductor 69 to one of the contact-pins $17'$. Mounted in one end of the strip 68 and extending through the plate $11'$ is a tubular ferrule 70 having an upwardly opening socket 71. Secured upon the underface of the plate $11'$ in perpendicular relation to the strip 68 by means of a rivet 72 is a phosphor-bronze contactor blade 73 provided in one end with a contact-button 74 and connected by means of an insulated conductor 75 to one of the contact-pins $17'$. Similarly secured to the underface of the plate $11'$ in parallel overlying relation to the contactor blade 73 by means of a rivet 76 is a second contactor blade 77 provided in one end with a contact-button 78 and connected by means of an insulated conductor 79 to one of the contact-pins $17'$. The contactor blade 77 is somewhat resilient and is normally flexed toward the contactor blade 73, so that contact-buttons 74, 78, are normally in circuit-making contact, as shown in FIG. 14. The contactor blade 77 integrally includes a lateral arm 80 which extends beneath the ferrule 70 and is provided with a contact-button 81.

Shiftably mounted in the ferrule 70 is a contact-rod 82 provided at its upper end with a cylindrical head 83 which abuts against the disk-flange $35'$ and bears against the upper end of a compression spring 84 disposed encirclingly around the rod 82 and seated at its lower end in the socket 71. At its lower end, the rod 82 is rounded off and is axially aligned with the contact-button 81 so that when the coil $22'$ is energized and pulls in, the disk-flange $35'$ will push the rod 82 downwardly and the rounded end will bear against the contact-button 81 making initial contact therewith. As the rod 82 moves downwardly, it flexes the contactor-blade 77 downwardly and shifts the contact-button 78 away from contact with the contact-button 74, as shown in FIG. 15.

Although the rod 82 is electrically in contact with the ferrule 70, there is always a possibility that the conductivity may be impaired due to oxidation and atmospheric conditions. Therefore, a bow-spring 85 is staked at one end to the strip 68 and seated at its other end in the head 83 of the rod 82.

It should be understood that changes and modifications in the form, construction, arrangement, and combination of the several parts of the solenoid operated switches may be made and substituted for those herein shown and described without departing from the nature and principle of my invention.

Having thus described my invention, what I claim and desire to secure by Letters Patent is:

1. A switch comprising a closed dielectric shell, a plurality of disks held in spaced relation within the shell and subdividing it transversely in the provision of two end compartments and an intermediate cage, one of said disks being a dielectric disk, a solenoid rigidly mounted in the cage and having a hollow core, a rod-like armature shiftably mounted within the hollow core for movement axially with respect to the solenoid when the latter is energized and de-energized, an actuator rigidly secured to and movable with the armature, said actuator extending outwardly from the solenoid and through the dielectric disk into the end compartment defined by such dielectric disk, first electrical contact-elements mounted upon said dielectric disk, second electrical contact-elements mounted in upwardly spaced relation to said first electrical contact-elements, each of said first and second contact-elements being insulated from each other, a spring-biased switch blade operatively mounted within the end compartment defined by said dielectric disk for swinging movement between said contact-elements whereby to make optional contact with either of said contact-elements, and means operatively associated with the switch blade and being adapted for mechanically engaging the actuator whereby to swing the blade optionally into contactive engagement with either of said contact-elements responsive to movement of the actuator.

2. A switch comprising a two-part dielectric housing having meeting edges along which the housing is secured together to form an enclosed shell, dielectric plate means and spaced metallic plate means mounted within the housing and extending thereacross whereby to subdivide the shell into an end compartment and a cage, a solenoid rigidly mounted in the cage and having a hollow core, a rod-like armature shiftably mounted within the hollow core for movement axially with respect to the solenoid when the latter is energized and de-energized, an actuator rigidly secured to and movable with the armature, said actuator extending outwardly from the solenoid into the cage, first electrical contact-elements mounted upon and carried by said dielectric plate means, means mounted on said dielectric plate means and supporting second electrical contact-elements in upwardly spaced relation to said first contact-elements, a spring-biased switch blade operatively mounted within said end compartment for swinging movement between each of said contact-elements whereby to make optional contact with either of said contact-elements, and means operatively associated with the switch blade and being adapted for mechanically engaging the actuator whereby to swing the blade optionally into contactive engagement with either of said contact-elements responsive to movement of the actuator.

3. A switch comprising a two-part dielectric housing having meeting edges along which the housing is secured together to form an enclosed shell, dielectric plate means and spaced metallic plate means mounted within the housing and extending thereacross whereby to subdivide the shell into an end compartment and a cage, a solenoid rigidly mounted in the cage and having a hollow core, a rod-like armature sheathed in a dielectric material shiftably mounted within the hollow core for movement axially with respect to the solenoid when the latter is energized and de-energized, an actuator rigidly secured to and movable with the armature, said actuator extending outwardly from the solenoid into the cage, first electrical contact-elements mounted upon and carried by said dielectric plate means, means mounted on said dielectric plate means and supporting second electrical contact-elements in upwardly spaced relation to said first contact-elements, a spring-biased switch blade operatively mounted within said end compartment for swinging movement between each of said contact-elements whereby to make optional contact with either of said contact-elements, and means operatively associated with the switch blade and being adapted for mechanically engaging the actuator whereby to swing the blade optionally into contactive engagement with either of said contact-elements responsive to movement of the actuator.

4. A switch comprising a two-part dielectric housing having meeting edges along which the housing is secured together to form an enclosed shell, means within the housing extending thereacross whereby to subdivide the shell into an end compartment and a cage, said means including a metallic portion and a dielectric portion, a solenoid rigidly mounted in the cage and having a hollow core lined with a metallic tube, a rod-like armature sheathed in a dielectric material shiftably mounted within the hollow core for movement axially with respect to the solenoid when the latter is energized and de-energized, an actuator rigidly secured to and movable with the armature, said actuator extending outwardly from the solenoid into the cage, opposed electrical contact-elements mounted within said end compartment and insulated from each other, a spring-biased switch blade operatively mounted within said end compartment for swinging movement between said contact-elements whereby to make optional contact with either of said contact-elements, and means operatively associated with the switch blade and being adapted for mechanically engaging the actuator whereby to swing the blade optionally into contactive engagement with either of said contact-elements responsive to movement of the actuator.

5. A switch comprising a dielectric housing, a pair of plate-like members rigidly secured within the housing in opposed spaced relation and subdividing it transversely in the provision of two end compartments and an intermediate cage, at least one of said plate-like members being a dielectric plate-like member, a dielectric spool rigidly mounted in the cage and having a hollow core, an electromagnetic coil wound upon the spool, a rod-like armature shiftably mounted within the hollow core for movement axially with respect to the solenoid when the latter is energized and de-energized, an actuator rigidly secured to and movable with the armature, said actuator having a diametrally enlarged flange extending outwardly into the end compartment defined by said dielectric plate-like member in spaced parallel relation to the dielectric plate-like member, opposed electrical contact-elements mounted on said last-named plate-like member and facing into the end compartment defined by said last-named plate-like member, a spring-biased switch blade operatively mounted within the end compartment defined by said dielectric plate-like member for swinging movement between said contact-elements whereby to make optional contact with either of said contact-elements, and means operatively associated with the switch blade and being adapted for mechanically engaging the actuator flange whereby to swing the blade optionally into contactive engagement with either of said contact-elements responsive to movement of the actuator.

6. A switch according to claim 5 in which the contact-elements and switch blade are of the make-after-break type.

7. A switch according to claim 5 in which the contact-elements and switch blade are of the make-before-break type.

8. A switch according to claim 1 in which the actuator is provided with a laterally projecting abutment surface which is substantially at right angles to its line of movement, and the means operatively associated with the switch blade is provided with an arcuate surface which bears operatively against the laterally projecting abutment surface of the actuator.

9. A switch according to claim 1 in which the actuator is provided with a laterally projecting abutment surface which is substantially at right angles to its line of movement, and the means operatively associated with the switch blade has a free end which is provided with an arcuate arm that bears operatively against the laterally projecting abutment surface of the actuator.

10. A switch according to claim 1 in which the actuator is provided at one end with a diametrally enlarged annular flange providing an abutment surface which is substantially at right angles to the line of movement to the actuator, and the means operatively associated with the switch blade has a free end which is provided with an arcuate arm that bears operatively against the abutment surface of the actuator.

11. A switch according to claim 2 in which the two parts forming the enclosed shell are interiorly provided with pairs of complementary slot-forming elements and are so arranged that the dielectric plate means and the metallic plate means respectively are slidably engaged thereby as the two parts of the housing are slid together into edgewise meeting relationship.

References Cited in the file of this patent
UNITED STATES PATENTS

| | | |
|---|---|---|
| 1,831,368 | Rubel | Nov. 10, 1931 |
| 2,279,395 | Gardiner | Apr. 14, 1942 |
| 2,499,216 | Frydman | Feb. 28, 1950 |
| 2,543,000 | Deakin | Feb. 27, 1951 |
| 3,005,890 | White | Oct. 24, 1961 |